Oct. 4, 1949. LE ROY SMELKER 2,483,478
AUTOMOBILE TENT
Filed June 10, 1946 4 Sheets-Sheet 1

INVENTOR.
LEROY SMELKER
BY
ATTORNEY

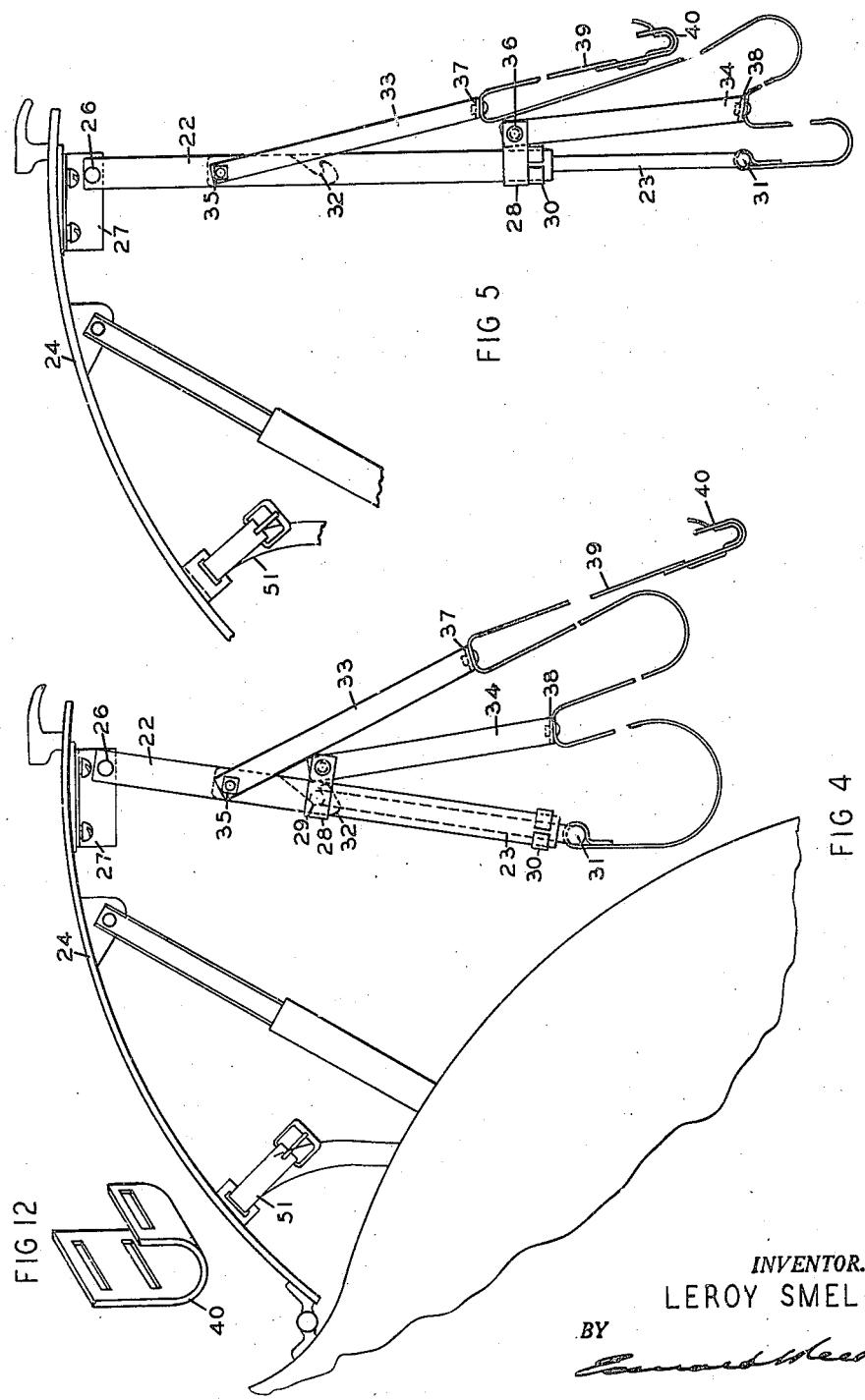

Oct. 4, 1949.                LE ROY SMELKER                2,483,478
                             AUTOMOBILE TENT
Filed June 10, 1946                                     4 Sheets-Sheet 3
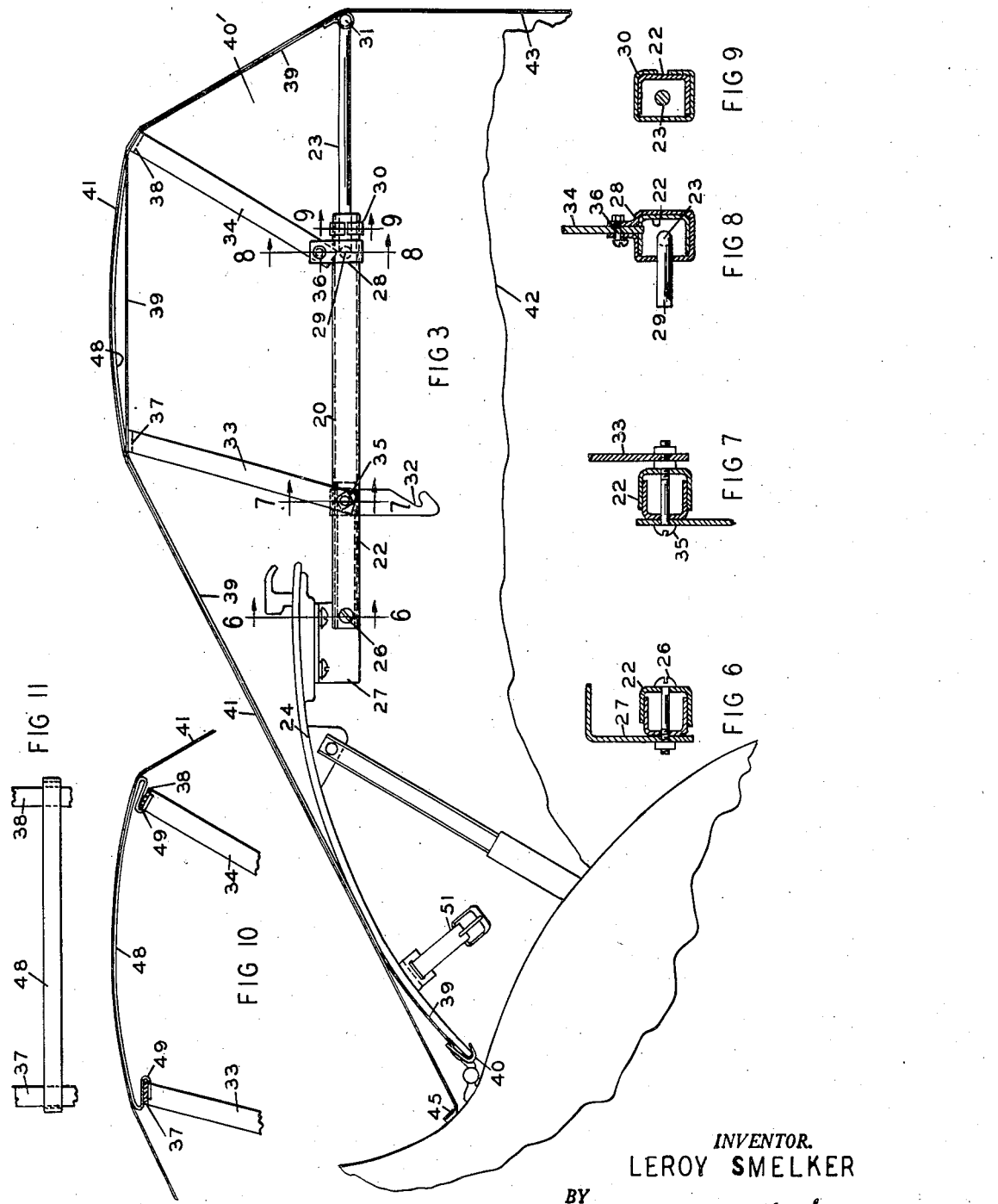
INVENTOR.
LEROY SMELKER
BY
ATTORNEY

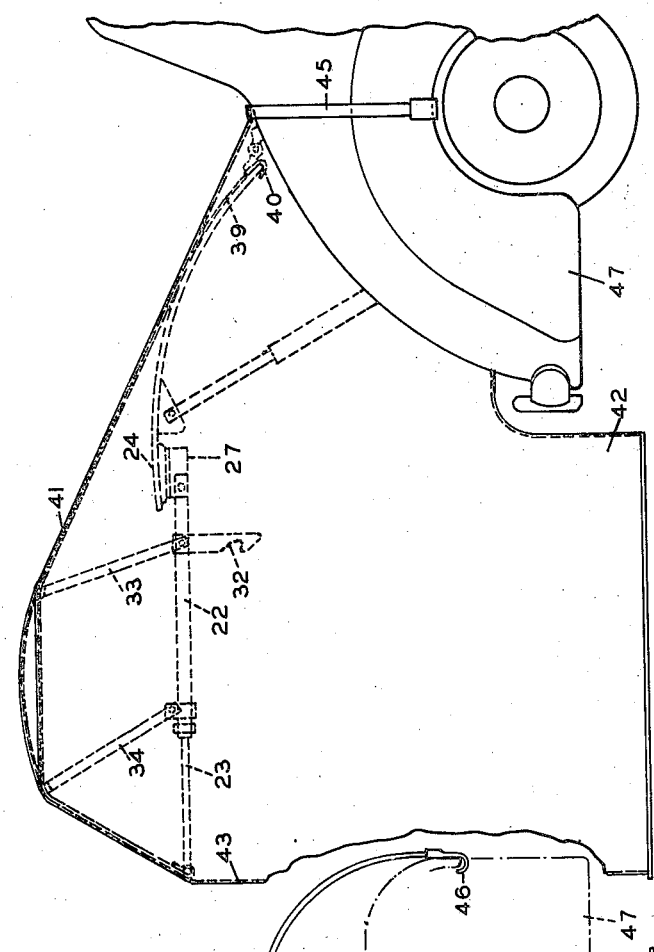
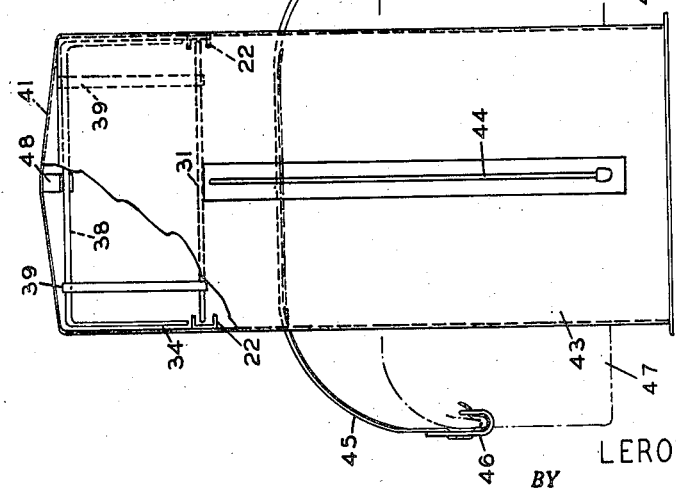

Patented Oct. 4, 1949

2,483,478

UNITED STATES PATENT OFFICE 2,483,478

AUTOMOBILE TENT

Le Roy Smelker, Dayton, Ohio, assignor of one-fourth to Helen May Smelker, one-fourth to Helen Virginia Bench, and one-fourth to Roy David Smelker Application June 10, 1946, Serial No. 675,625

24 Claims. (Cl. 135—4)

This invention relates to an automobile tent, that is, a tent adapted to be attached to an automobile to provide shelter or privacy exteriorly thereof. Such a tent has many uses, such as, for example, a dressing room either at a bathing beach or in connection with an automobile the seats of which are convertible into beds.

One object of the invention is to provide such a tent which can be stored in a collapsed condition on an ordinary passenger automobile and can be quickly and easily erected and then again collapsed for storage in the automobile.

A further object of the invention is to provide a tent which is supported wholly by the automobile, without the use of tent poles or the like.

A further object of the invention is to provide a tent of simple construction and light weight which can be folded into a very compact bundle and supported in the luggage compartment of an automobile in such a manner as to leave room for luggage or the like.

A further object of the invention is to provide a tent which is supported by the closure for the rear or luggage compartment of the automobile, both when collapsed and when erected.

A further object of the invention is to provide a tent which can be attached to an automobile with little or no change in the structure or appearance of the automobile.

Other objects of the invention may appear as the tent is described in detail.

Figure 1:
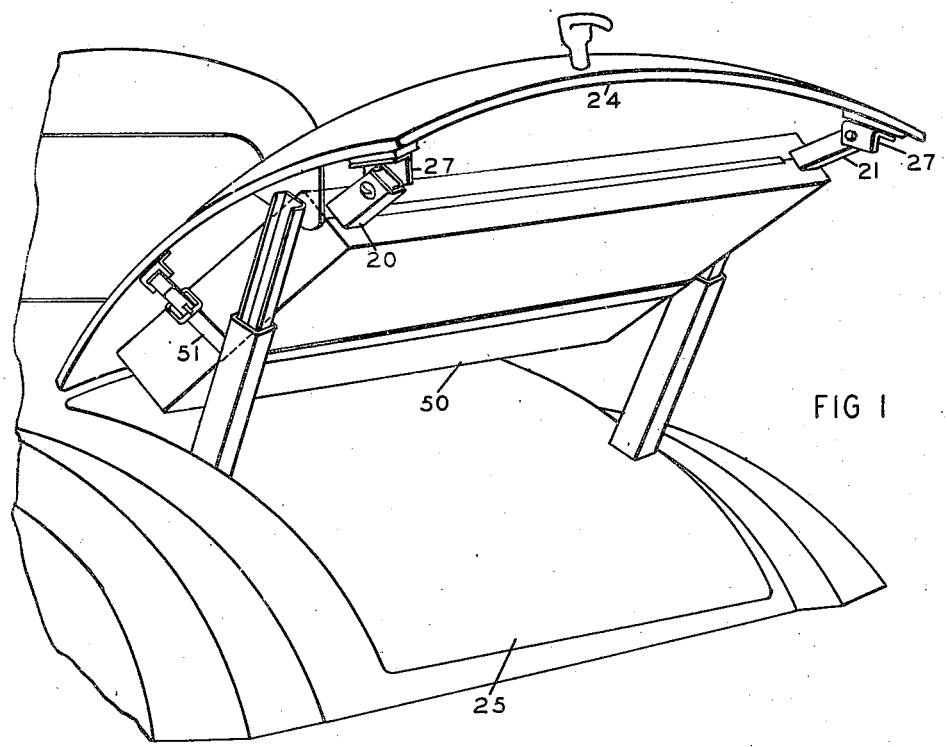
Figure 2:
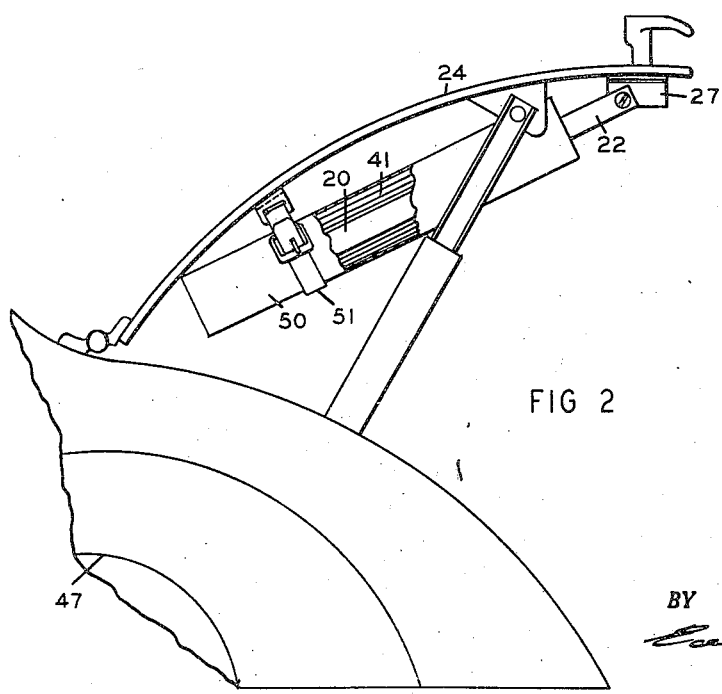

In the accompanying drawings Fig. 1 is a perspective view of the rear end of an automobile showing the collapsed tent supported on the closure for the rear compartment of the automobile; Fig. 2 is a side elevation of the structure shown in Fig. 1, partly broken away; Fig. 3 is a side elevation of the erected tent, with a portion of the canopy broken away; Fig. 4 is a side elevation of the collapsed canopy supporting frame in an intermediate position; Fig. 5 is a similar view showing the frame in its extended condition; Fig. 6 is a transverse section on the line 6—6 of Fig. 3; Fig. 7 is a section on the line 7—7 of Fig. 3; Fig. 8 is a section on the line 8—8 of Fig. 3; Fig. 9 is a section on the line 9—9 of Fig. 3; Fig. 10 is a detail view of a supplemental support for the canopy; Fig. 11 is a plan view of that support; Fig. 12 is a detail view of a connecting device for the frame supporting strap; Fig. 13 is a side elevation of the tent in its erected position with a portion of the canopy broken away; and Fig. 14 is a rear elevation of the erected tent.

In these drawings I have illustrated one embodiment of the invention and have shown the same attached in the preferred manner to the rear end of an automobile of a well known type, but it is to be understood that the tent is mounted at that end of the automobile opposite the engine, and, if the engine is arranged at the rear end of the automobile the tent would be attached to the front end of the latter, and the term "rear" as herein used is intended to refer to that end of the automobile opposite the engine. It is also to be understood that the tent as a whole, as well as the several parts thereof, may take various forms and may be attached to the automobile in various ways without departing from the spirit of the invention.

The tent comprises a frame adapted to be mounted on and supported by the rear portion of an automobile, and a canopy to extend over and to be supported by the frame. Preferably, the frame is collapsible and is mounted on the closure for the rear, or luggage, compartment of the automobile for movement, in a collapsed condition, into said compartment or to a rearwardly projecting and extended position to receive the canopy.

In the particular embodiment here illustrated the tent comprises a canopy supporting frame which includes two side members 20 and 21, each of which comprises two parts 22 and 23. The forward parts 22 of the two side members are supported on the closure 24 for the rear compartment 25 of an automobile. In the present instance the frame members 22 are pivotally connected by bolts 26, with lugs 27 rigidly secured to the lower side of the rear portion of the closure 24. The second or rear portion 23 of each frame member 20 is connected with the front portion 22 thereof in such a manner that it can be collapsed by moving the same to a position extending lengthwise of and alongside of the front portion 22 or to a position in which it extends rearwardly beyond the front portion 22. In the present instance the part 22 of the frame member is channel shaped, and the rear part 23 is slidably mounted in the same. In the arrangement shown the part 23 is supported in the part 22 by a band or clip 28 extending about the channel shaped member 22. The part 23 has at its forward end a laterally extending portion 29 which extends through the clip 28 to connect the part 23 with the clip. A band 30 extends about the rear end of the part 22 to limit the rear movement of the part 23. In the present arrangement the two parts 23 are connected at their rear ends by a cross member 31, thus in effect constituting a single U-shaped member. Preferably, means are provided for retaining the rear part 23 in its retracted position with relation to the front part 22, and as here shown, a latch 32 is pivotally mounted on the part 22 near its front end and is adapted to engage the projecting portion 29 of the member 23 when the latter is in its retracted position.

It is preferable that the pivoted side frames 20 and 21 shall be supported wholly on the automobile when in their rearwardly projecting positions. For this purpose I have provided a supporting device somewhat in the nature of a truss. There are mounted on the side frames 20 and 21 one or more upwardly extending members, in the present instance two, 33 and 34. These upwardly extending members are shown as of inverted U-shape, the legs of the U-shaped member 33 being pivotally mounted at 35 on the respective frame members 22, and the legs of the U-shaped member 34 being pivotally mounted at 36 on the clip 28 which is connected with and moves with the rear frame member 23. The members 33 and 34 are movable to positions in which they extend lengthwise of and close to the respective members 22 and 23 of the side frames, or to upwardly extending positions, as shown in Fig. 3, when the side frames are in their extended positions. One or more flexible members are connected with the rear ends of the side frames, and in the present instance two straps 39 are attached to the transverse bar 31 which connects the members 23 of the side frames one with the other. These straps extend upwardly from the cross bar 31 over the transverse portions of the U-shaped supporting members 33 and 34, to which they are preferably attached, thence downwardly and forwardly and are provided at their front ends with means whereby they may be connected with the automobile. In the present instance each strap is provided with a hook 40 which can be engaged about the rear edge of the closure 24 when the latter is in its open position. Thus the frame is supported solely by the closure 24.

The canopy, indicated as a whole by the reference numeral 40', is preferably of canvas, or other suitable flexible material, and may be of any desired shape or size adapted to be supported by the frame. In the present instance the canopy is of a height and of horizontal dimensions such as to adapt it for use as a dressing room, but it can be enlarged sufficiently to serve as a sleeping room merely by lengthening the canopy supporting frame and correspondingly enlarging the canopy. As here shown the canopy comprises a top portion 41, side walls 42 and a rear wall 43. The rear and side walls preferably extend close to the ground so as to provide a complete enclosure. The rear wall 43 is provided with a vertical slit or opening 44 through which entrance may be had to the tent. The top portion of the canopy extends over the cross bar 31 of the supporting frame, over the upright supporting members 33 and 34 and then downwardly beyond the canopy supporting frame to the body of the automobile, to which it is attached. The attaching means may take various forms and is here shown as a strap 45, which is secured to the rear portion of the canopy top and extends across the body of the automobile in front of the closure 24 and then downwardly and is provided with hooks 46 adapted to engage about the lower edges of the respective fenders 47. At least one of the hooks is adjustably connected with the strap so that the latter may be drawn tight and caused to clamp the rear portion of the canopy tightly to the body of the automobile.

In order to prevent the intermediate portion of the canopy top from sagging and holding water when wet, means are provided for elevating this intermediate portion of the top, so that it will slope laterally as well as fore and aft and will thus shed the water more effectively. For this purpose there is provided a supplemental frame member 48 which is provided at its ends with hook shaped portions 49 adapted to have supporting engagement with the cross bars 37 and 38 of the upwardly extending members 33 and 34. This bar is so shaped that it extends above the level of the cross bars and slopes rearwardly and forwardly. By positioning the same adjacent the longitudinal center of the top the latter can be caused to slope laterally. The hook shaped ends of the bar 48 enable it to be readily detached from the frame members 33 and 34 when the frame is to be collapsed, and it can be easily mounted on the upright members either before or after the canopy is in position on the frame.

When the tent is to be collapsed for storage in the automobile compartment the strap 45 is detached from the fenders to release the front end of the canopy, and the latter is withdrawn forwardly over the supporting frame. The flexible supporting member 39 is then detached from the front edge of the closure 24, and the bar 48 having been removed, the frame structure as a whole is released and swings downwardly to an intermediate and substantially upright position beneath the rear end of the closure 24, as shown in Figs. 4 and 5. However, in these figures the spacing between the side frames and the upright supporting members 33 and 34 is exaggerated to facilitate the illustration. Either before or after the frame structure is moved to this vertical position the rear frame members 23 are moved forwardly to their retracted positions and secured in those positions by the hooks 32. When the frame members are in these positions the cross bars 31, 37 and 38 are adjacent one to the other and at substantially the same distances from the closure. The canopy is then folded to such a width that it may be inserted between the side frames 20 and 21 and supported on the transverse bars. The canopy is also folded in such a manner that when the end portions thereof, on opposite sides of the transverse bars, are moved upwardly with relation to the transverse bars the whole of the canopy and the supporting frame will be folded into a compact bundle of a vertical length approximating the length of the collapsed side members. The folded tent is then secured in its folded condition, preferably by drawing over the same a bag 50 which serves not only to confine the folded structure in a very compact easily handled form, but also provides a protective covering therefor and imparts a neat appearance thereto. The collapsed and enclosed tent is then swung forwardly and upwardly to a position close to the inner side of the closure 24 and may be supported in that position in any suitable manner, as by a strap 51 secured to the closure. When in this position the closure 24 may be moved to its closed position and locked in the usual manner. The collapsed tent being supported close to the closure, there remains in the compartment 45 substantial space for the storing of luggage or other articles.

When the tent is to be erected the closure 24 is moved to and locked in its open position, the strap 51 is released to permit the collapsed tent structure to move to a substantially vertical position, the bag 50 is stripped from the folded canopy and frame and the folded canopy is removed from the frame. The frame is then swung to its rearwardly projecting position and extended to its full length. The supporting strap 39 is then drawn forwardly, thereby moving the supporting members 33 and 34 to upright positions, and is connected with the rear edge of the closure. The canopy is then placed in position over the frame and secured to the body of the automobile. This completes the erection of the tent, which can be accomplished in a very short time.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. A tent adapted to be attached to the rear portion of an automobile and comprising a collapsible canopy supporting frame, means for connecting said frame adjacent the forward end thereof with said automobile in rearwardly extending relation thereto, and other means for connecting the rear portion of said frame with said automobile, said connecting means constituting the sole support for said frame.

2. A tent adapted to be attached to an automobile having in the body thereof and adjacent the rear end thereof a compartment, a canopy supporting frame, means for supporting said frame adjacent the forward end thereof on said automobile for movement into said compartment or to a position in which it projects rearwardly from said automobile, and a device to connect the rear portion of said frame with said automobile and support the same in said rearwardly projecting position.

3. A tent adapted to be attached to an automobile having in the body thereof a rearwardly facing compartment, a closure therefor and means for supporting said closure in a rearwardly extending open position, said tent comprising a canopy supporting frame, and means for connecting said frame with said closure and supporting the same in a rearwardly extending position with relation thereto.

4. A tent adapted to be attached to an automobile having in the body thereof a rearwardly facing compartment and a rearwardly extending closure hinged at its forward edge thereto therefor, and comprising a canopy supporting frame, means for pivotally connecting said frame with the rear portion of said closure for movement to a rearwardly extending position with relation thereto, and a supporting device connected with the rear portion of said frame and with said automobile in front of said pivotal connection.

5. A tent adapted to be connected with the closure for the rearwardly facing compartment of an automobile and comprising an extensible canopy supporting frame, means for supporting the front portion of the extended frame on said closure when the latter is in its open position, and other means connected with the rear portion of said frame for supporting the latter in a substantially horizontal position.

6. A tent adapted to be connected with the closure for the rearwardly facing compartment in an automobile body and comprising a collapsible canopy supporting frame, means for connecting said frame with said closure for movement into said compartment when in its collapsed condition and to a rearwardly projecting position when in its extended condition, and other means connected with the rear portion of said frame and with said automobile to support said frame in an extended position.

7. A tent adapted to be connected with the rearwardly extending closure for the rear compartment of an automobile and comprising a collapsible canopy supporting frame, means for pivotally connecting the forward portion of said frame with the rear portion of said closure, means for supporting the collapsed frame on and close to the inner side of said closure within said compartment when said closure is in its closed position, and other means to supportingly connect the rear portion of the extended frame with said automobile in front of said pivotal connection.

8. A tent adapted to be attached to an automobile of the type having a rearwardly facing compartment and a closure therefor, and comprising a canopy supporting frame having means whereby it may be supported on said closure in a forwardly extending position when said closure is in its closed position and in a rearwardly extending position when said closure is in its open position, and means for supportingly connecting the rear portion of said frame with said automobile when said frame is in said rearwardly extending position.

9. A tent adapted to be attached to an automobile of the type having a rearwardly facing compartment and a closure therefor, and comprising a canopy supporting frame having means whereby it may be supported on said closure in a forwardly extending position when said closure is in its closed position and in a rearwardly extending position when said closure is in its open position, and means for supportingly connecting the rear portion of said frame with said automobile when said frame is in said rearwardly extending position, said frame having means for supporting the top of the canopy above and in spaced relation to said frame.

10. A tent adapted to be attached to an automobile of the type having a rearwardly facing compartment and a closure therefor, and comprising a canopy supporting frame having means whereby it may be supported on said closure in a forwardly extending position when said closure is in its closed position and in a rearwardly extending position when said closure is in its open position, said frame having an upwardly extending part spaced forwardly from the rear end thereof, and a flexible supporting device connected with the rear portion of said frame, extending forwardly over said upwardly extending part and having means whereby it may be connected with said automobile in front of said frame.

11. A tent adapted to be attached to an automobile of the type having a rearwardly facing compartment and a closure therefor, and comprising a canopy supporting frame having means whereby it may be supported on said closure in a forwardly extending position when said closure is in its closed position and in a rearwardly extending position when said closure is in its open position, said frame having an upwardly extending part spaced forwardly from the rear end thereof, and a flexible supporting device connected with the rear portion of said frame, extending forwardly over said upwardly extending part and having means whereby it may be connected with said automobile in front of said frame, said upwardly extending part of said frame also having means to support the top of said canopy in spaced relation to said frame.

12. A tent adapted to be attached to an automobile of the type having a rearwardly facing compartment and a closure therefor, a canopy supporting frame having means whereby it may be pivotally supported on the lower side of said closure adjacent the rear edge of the latter for movement to a forwardly extending position beneath said closure when the latter is in its closed position or to a rearwardly extending position when said closure is in its open position, and a supporting device connected with the rear portion of said frame, extending forwardly at an angle to said frame and having means whereby it may be connected with said automobile to support said frame in said rearwardly extending position.

13. A tent adapted to be connected with the closure for the rearwardly facing compartment of an automobile, and comprising a collapsible frame having means whereby it may be supported by said closure in rearwardly extending relation thereto when said closure is in its open position, a foldable canopy to be supported on said frame, and means for connecting the front portion of said canopy with the body of said automobile.

14. A tent adapted to be connected with the closure for the rearwardly facing compartment of an automobile, and comprising a collapsible frame having means whereby it may be supported by said closure in rearwardly extending relation thereto when said closure is in its open position, a foldable canopy to be supported on said frame, means for connecting the front portion of said canopy with the body of said automobile, and means for supporting the collapsed frame and folded canopy on the inner side of said closure when the latter is in its closed position.

15. A tent adapted to be connected with the closure for the rearwardly facing compartment of an automobile and comprising a collapsible frame, means for pivotally supporting said frame on the rear portion of said closure for movement to a rearwardly extending position when said closure is in its open position, a flexible supporting device connected with the the rear portion of said frame, extending forwardly above said closure and having means for connecting the same with a part of said automobile, a foldable canopy supported by said frame and having a part extending forwardly above said closure, and means for securing said forwardly extending part of said canopy to the body of said automobile.

16. A tent adapted to be connected with the closure for the rearwardly facing compartment of an automobile and comprising a collapsible frame, means for pivotally supporting said frame on the rear portion of said closure for movement to a rearwardly extending position when said closure is in its open position, a flexible supporting device connected with the rear portion of said frame, extending forwardly above said closure and having means for connecting the same with a part of said automobile, a foldable canopy supported by said frame and having a part extending forwardly above said closure, means for securing said forwardly extending part of said canopy to the body of said automobile, said frame and said canopy being foldable into a compact bundle pivotally supported by said closure, and means for supporting said bundle beneath and close to said closure when the latter is in its closed position.

17. A tent adapted to be connected with the rear portion of an automobile having a rearwardly facing compartment and a closure therefor, said tent comprising frame members each including a part having means whereby it may be connected with said closure for movement to a position beneath said closure or to a position extending rearwardly therefrom, and a second part supported by the first-mentioned part and movable to a retracted position alongside the latter or to a position extending beyond the rear end thereof, and a supporting member connected with said frame members and movable to a position above the same when said frame members are in their rearwardly extending positions.

18. A tent adapted to be connected with the rear portion of an automobile, and comprising extensible frame members having means whereby they may be mounted on said automobile for movement to positions extending rearwardly therefrom, and an inverted U-shaped element the legs of which are connected with the respective frame members for movement to positions extending lengthwise of said frame members or to positions extending upwardly therefrom.

19. A tent adapted to be connected with the rear portion of an automobile having a rear compartment and a closure therefor, said tent comprising extensible frame members each including an elongate part having means whereby it may be mounted on said closure for movement to a position extending rearwardly therefrom, and a second elongate part mounted on the first-mentioned part for movement to a position in which it extends beyond the outer end of the latter, supporting elements mounted respectively on the corresponding parts of said frame members for movement to positions extending lengthwise thereof or to positions in which they extend upwardly therefrom when said frame members are in said rearwardly extending positions, and means for retaining said supporting elements in said upwardly extending positions.

20. A tent adapted to be connected with the rear portion of an automobile having a rear compartment and a closure therefor, said tent comprising extensible frame members each including an elongate part having means whereby it may be mounted on said closure for movement to a position extending rearwardly therefrom, and a second elongate part mounted on the first-mentioned part for movement to a position in which it extends beyond the outer end of the latter, supporting elements mounted respectively on the corresponding parts of said frame members for movement to positions extending lengthwise thereof or to positions in which they extend upwardly therefrom when said frame members are in said rearwardly extending positions, a flexible frame supporting device connected with said second parts of said frame members and with said supporting elements, and having means whereby it may be connected with said automobile.

21. A tent adapted to be connected with the rear portion of an automobile having a rear compartment and a closure therefor, said tent comprising extensible frame members each including an elongate part having means whereby it may be mounted on said closure for movement to a position extending rearwardly therefrom, and a second elongate part mounted on the first-mentioned part for movement to a position in which it extends beyond the outer end of the latter, supporting elements mounted respectively on the corresponding parts of said frame members for movement to positions extending lengthwise thereof or to positions in which they extend upwardly therefrom when said frame members are in said rearwardly extending positions, means for retaining said supporting elements in said upwardly extending positions, a canopy having a top portion to be supported on said supporting elements, and a device supported by said supporting elements and extending lengthwise of said frame members above said supporting elements to elevate an intermediate portion of the top of said canopy.

22. A tent adapted to be connected with the rear portion of an automobile having a rear compartment and a closure therefor, said tent comprising extensible frame members each including an elongate part having means whereby it may be mounted on said closure for movement to a position extending rearwardly therefrom, and a second elongate part mounted on the first-mentioned part for movement to a position in which it extends beyond the outer end of the latter, supporting elements mounted respectively on the corresponding parts of said frame members for movement to positions extending lengthwise thereof or to positions in which they extend upwardly therefrom when said frame members are in said rearwardly extending positions, and means for releasably retaining said second parts of said frame members in retracted positions with relation to the first-mentioned parts thereof.

23. A tent adapted to be attached to an automobile having a rearwardly facing compartment and a closure therefor, and comprising a canopy supporting frame, means for connecting said frame with said closure and supporting the same in a rearwardly extending position with relation thereto, a canopy adapted to extend over and to be supported by said frame and having a part to extend rearwardly from said frame, and means for securing said rearwardly extending part to the body of said automobile.

24. A tent adapted to be attached to an automobile having a rearwardly facing compartment and a closure therefor, and comprising a canopy supporting frame, means for connecting said frame with said closure and supporting the same in a rearwardly extending position with relation thereto, a canopy adapted to extend over and to be supported by said frame and having a part to extend rearwardly beyond said closure, a strap secured to the forward portion of said canopy, and means for detachably connecting the ends of said strap with the respective fenders of said automobile.

LE ROY SMELKER.

REFERENCES CITED

The following references are of record in the file of this patent:

UNITED STATES PATENTS

| Number | Name | Date |
| --- | --- | --- |
| 1,508,065 | Ramsdell | Sept. 9, 1924 |
| 1,712,836 | Mills | May 14, 1929 |
| 2,054,673 | Hastings | Sept. 15, 1936 |